United States Patent  [11] 3,629,703

[72] Inventor Georges Bernard
 Saint-Egreve, France
[21] Appl. No. 51,264
[22] Filed June 30, 1970
[45] Patented Dec. 21, 1971
[73] Assignee Merlin Gerin, Societe Anonyme
 Grenoble, France
[32] Priority July 7, 1969
[33] France
[31] 6923035

[54] BALANCED BRIDGE OPTICAL TRANSMISSION TELEMETERING DEVICE FOR MEASURING AN ELECTRICAL QUANTITY ASSOCIATED WITH A POWERLINE WITH AN INDEPENDENT OPTICAL BALANCING SYSTEM
7 Claims, 3 Drawing Figs.

[52] U.S. Cl. .................................................. 324/96,
 340/190, 250/210, 250/199
[51] Int. Cl. ..................................................... G01r 31/00
[50] Field of Search............................................ 324/96;
 340/189, 190; 250/199, 210, 216, 225

[56] References Cited
UNITED STATES PATENTS
3,419,802  12/1968  Pelenc et al. ................. 324/96

Primary Examiner—Rudolph V. Rolinec
Assistant Examiner—R. J. Corcoran
Attorney—Stevens, Davis, Miller & Mosher ABSTRACT: Telemetering device for sensing an electrical quantity such as the current or the voltage associated with a high-voltage powerline. The rotation of the polarization plane of a polarized light beam directed from the vicinity of said powerline to ground and having traversed a magneto-optically or electro-optically transducer sensitive to said quantity is measured at a ground station where the light beam is divided in a pair of elementary beams directed to a pair of photoelectrical devices inserted in a measuring bridge. The bridge is balanced by a servomechanism controlled by the electrical error signal produced in the bridge under the influence of an independent second divided light beam.

BALANCED BRIDGE OPTICAL TRANSMISSION TELEMETERING DEVICE FOR MEASURING AN ELECTRICAL QUANTITY ASSOCIATED WITH A POWERLINE WITH AN INDEPENDENT OPTICAL BALANCING SYSTEM

This invention relates to a balanced bridge optical transmission telemetering device for measuring an electrical quantity associated with a powerline.

The invention is particularly concerned with a measuring device comprising means to direct a measuring beam of polarized light from the vicinity of a powerline, such as a high-voltage overhead line, to a measuring station, usually a ground station. A transducer is located in the vicinity of the powerline and is traversed by the polarized light beam to modulate the light beam under the influence and as a function of an electrical quantity exciting the transducer and which may be the voltage of the line or the current flowing therein. The modulated light beam is processed at the ground station whereby appropriate photoelectric means develop an electrical signal that is representative of the actual value of said electrical quantity.

Devices of this kind have been proposed for instance by U.S. Pat. No. 3,324,393, No. 3,419,802 and No. 3,419,803. Usually the transducer comprises a Faraday element having a light transparent magneto-optically active body that is capable of rotating the plane of polarization of the plane polarized light beam by an angular amount substantially proportional to the actual value of a current producing a magnetic field in said body. The current may be the current flowing in the powerline or any current derived from any electrical quantity associated with the powerline.

Whereas transducers based on the Faraday effect seem particularly useful in measuring said quantity, other magneto-optical or electro-optical effects may be used in embodying the invention, such as the magneto-optical Cotton-Mouton effect or the electro-optical Kerr effect or Pockels effect.

The modulated light beam emerging from the transducer is transmitted to the measuring station and may be guided between the high-voltage line and the ground station by light-conveying means such as an insulated optical guide tube.

At the ground station, the polarization plane angle modulated light beam traverses—preferably but not necessarily—a second transducer, such as a second Faraday effect element, which has a compensating function and tends to produce an opposite rotation of substantially equal angular amount as the angular amount of the rotation produced by the first named transducer located near to the powerline. This compensation makes it possible to use a null method which eliminates certain errors, such as the aging of photoelectric means. For this purpose, a secondary current energizes the second transducer and is derived from photoelectric means located in the path of the compensated light beam which emerges from the second, compensating, transducer.

It has already been proposed in the U.S. Pat. No. 3,419,802 to divide the light beam emerging from said first transducer or from said second transducer, if any, into a pair of elementary light beams, for instance by means of a semireflecting plate which may advantageously be disposed at Brewster's angle with respect to the incident polarized light beam. The two elementary light beams traverse a pair of analyzers and illuminate a pair of photoelectric means, respectively, such as a pair of photoelectric cells. The cells are electrically inserted into two branches of an electrical measurement bridge developing an electrical output signal which is representative of the electrical quantity to be measured.

This differential measurement eliminates disturbances due to induction noise phenomena and mechanical vibrations and has given full satisfaction for the measurement of alternating current of industrial frequency.

Unfortunately, the measurement of direct currents or voltages, or of currents or voltages of low frequency is disturbed by drift phenomena the value of which may reach or even exceed the value to be measured.

Thus, an object of the invention is to provide a measuring device comprising means to automatically balance the bridge in order to avoid drift phenomena.

Another object of the invention is to provide a measuring device that permits faithful and accurate measurement of a DC or low frequency electrical quantity associated with a high-voltage overhead line.

Still another object of the invention is to provide a measuring device of the kind mentioned which is insensitive to fluctuations in the light-producing, light-transmitting and light-converting parameters of the system.

Still another object of the invention is to provide a measuring device of the kind mentioned comprising simple electro-optical bridge balance means avoiding undesirable interference phenomena in the processing of the main light beam.

In carrying out the invention, an independent second light beam is introduced in the path of the main polarized light beam ahead of the measurement bridge whereby said second light beam is divided into a pair of elementary light beams which are transmitted to the photoelectric means of the bridge to develop an electrical error signal capable of balancing the bridge.

In a preferred embodiment of the invention, undesirable interference phenomena between the main and the second light beams involving "misinterpretation" by the measurement bridge, which confuses main and second light beam information, is avoided by appropriate amplitude-modulation of the secondary beam combined with suitable filter systems.

The invention will be better understood upon reading of the following description of some embodiments shown in the accompanying drawings, wherein.

Figure 1:
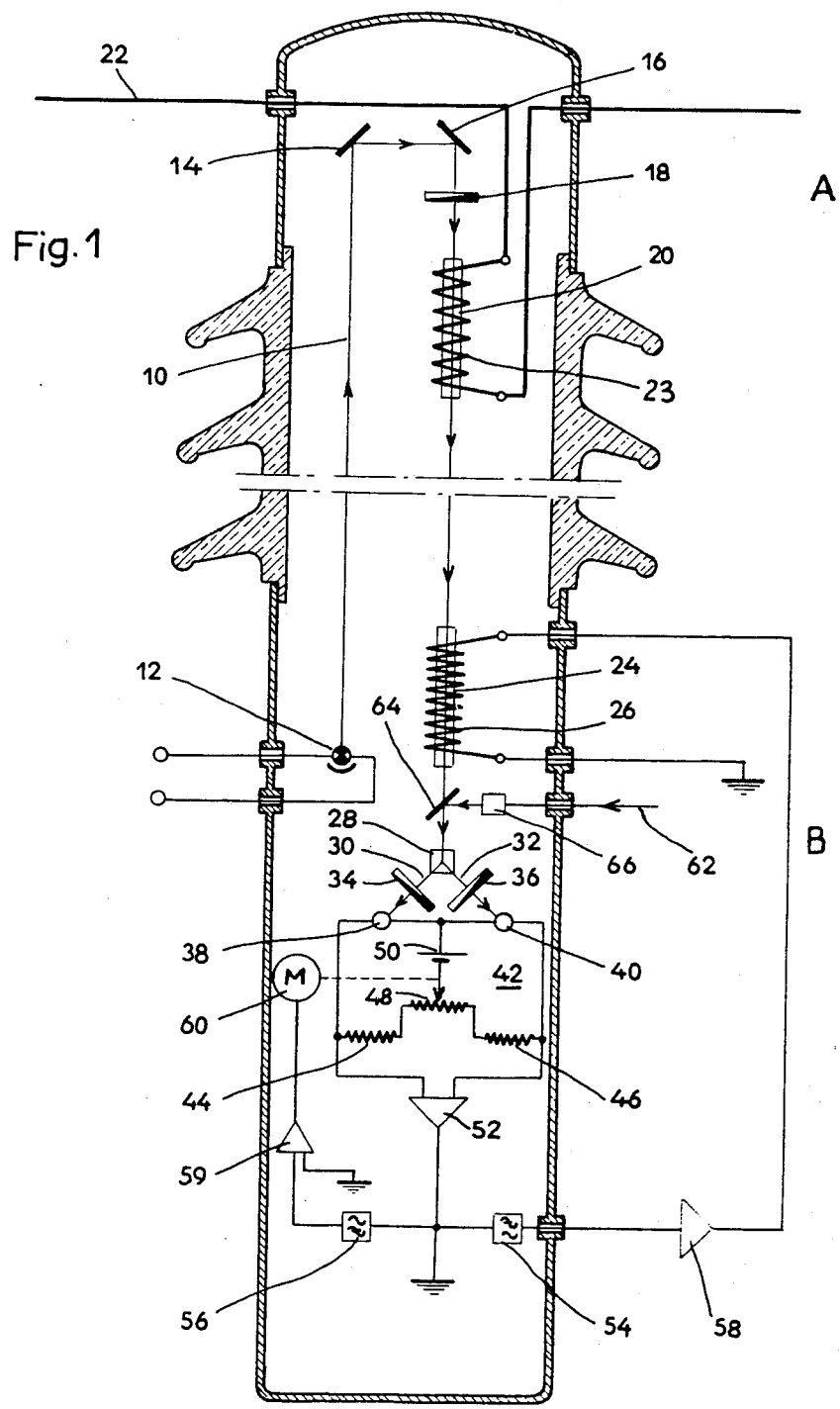
FIG. 1 is a diagrammatic view of a measuring device according to the invention.

In FIG. 1, a beam of light 10 is emitted by a source 12, located in a measuring station designed by the general reference B at or near to earth potential and is directed towards a high-voltage overhead conductor 22. In the high-voltage zone generally designated by the reference A, the beam 10 is redirected towards the ground by a pair of mirrors 14 and 16 and is polarized by a polarizer 18. A Faraday magneto-optical transducer 20 is traversed in this zone by the polarized beam and the plane of polarization of the beam 10 undergoes in this cell a rotation which is a function of the current flowing in the energizing coil 23 of the cell, this current, in the example selected, being the electrical quantity to be measured, the coil 23 being connected in series with the powerline 22. The polarized beam, which is modulated in the spatial position of its plane of polarization by the device 20, passes through a second magneto-optical transducer, which, in the example selected, is formed of a second Faraday magneto-optical cell 24. This compensation cell 24 is located in the measuring station B and excited by the secondary current passing through its energizing coil 26 and it has the function of returning the plane of polarization of the beam leaving it substantially to its original position, that is to say, to the position of the beam emerging from the polarizer 18. An optical device 28, such as a semireflective plate divides the polarized beam into two elementary beams 30 and 32 passing through a pair of detecting analyzers 34 and 36, respectively, and finally impinge on a pair of photoelectric cells 38 and 40, respectively. The electrical terminals of the cells 38 and 40 are inserted in two branches of an electrical measurement bridge 42, the other two branches of which consist of two fixed resistors 44 and 46 connected by the resistor of a potentiometer 48. A source of direct current 50 arranged in a diagonal of the bridge connects the junction point between the cells 38 and 40 to the slider of the potentiometer 48. The voltage of the other diagonal of the bridge is applied to a differential amplifier 52 whose output feeds on the one hand a low-pass filter 54 and on the other hand a high pass filter 56. The output of the low-pass filter 54 feeds the coil 26 via an amplifier 58, and the output of the high pass filter 56, feeds via an amplifier 59 a servomotor 60 controlling the position of the slider of the potentiometer 48.

A beam of unpolarized light 62 is injected between the cell 24 and the device 28 into the path of light of the main beam, for instance by means of a semireflective plate 64 and this secondary light beam is superimposed on the main beam after having previously passed through a modulator 66, for instance a rotary Maltese cross which periodically obscures the beam 62 at a frequency definitely greater than that of the current to be measured which flows in the coil 23.

This balancing device operates in the following manner (the processing of the main beam or measurement beam 10 is described in the aforementioned U.S. Pat. No. 3,419,802 and will not be further described in the present specification):

The beam 62, called the balancing beam, is divided by the device 28 in the same manner as the main beam 10. These elementary beams of the beam 62 strike the photocells 38 and 40 and create an error signal at the output of the differential amplifier 52 in case of unbalance of the bridge 42. This error signal is transmitted by the high pass filter 56 and the amplifier 59 (which is connected with negative feedback) to actuate the servomotor 60 which is then immediately operated to return the bridge to its balanced position by control of the slider of the potentiometer 48.

The low-pass filter 54 does not permit passage of the error signal produced by the secondary beam of light 62 but freely passes the signal coming from the amplifier 52 and corresponding to the principal measurement, the current produced in the coil 26 of the compensation cell 24 causing a rotation of the plane of polarization of the main beam 10 equal but opposite to the rotation produced in the cell 20 as indicated in the aforementioned patent.

Figure 2:
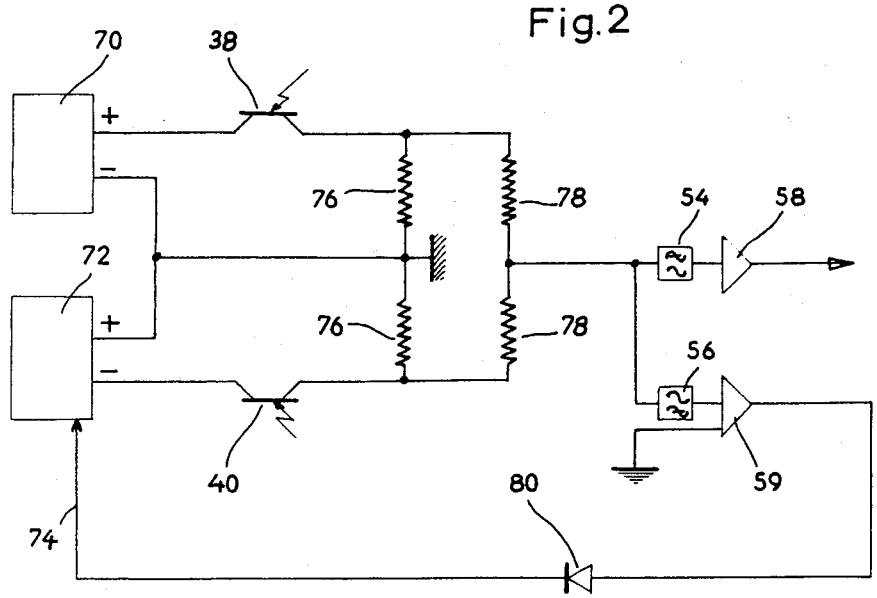
FIG. 2 shows the electric circuit diagram of an embodiment of the measurement bridge and of its servomechanism.

FIG. 2 shows another embodiment of the measurement bridge according to the invention whereby the servosystem is nonmechanical. The photoelectric cells 38 and 40 are now connected in series with two sources of direct current 70 and 72 respectively, controlling balance of the bridge, the voltage of the source 72 being adjustable and being controlled at 74 by the output voltage of the amplifier 59, to reset this voltage to zero. The two resistors 76 of the differential input are fixed resistors and the error signal as well as the measurement signal are taken from a voltage divider 78. The error signal is passed solely be the high pass filter 56 and the amplifier 59 to regulate via a diode 80 the voltage of the source 72 so as to balance the bridge again. The measurement signal is transmitted by low-pass filter 54 to amplifier 58, as hereinabove.

Figure 3:
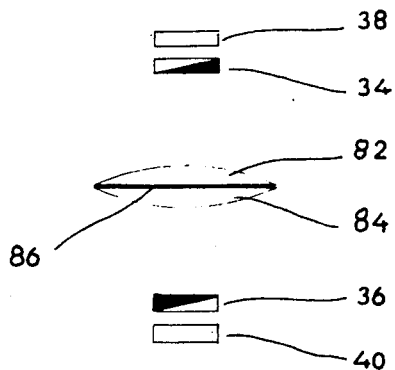
FIG. 3 shows schematically a possibility for the injection of the balancing beam.

FIG. 3 shows an advantageous solution for the injection of the beam 62. The main beam 10 and the secondary balancing beam 62 are directed in spatial opposition towards an optical device comprising two focusing lenses 82 and 84, arranged back to back with the provision between them of a semireflective surface 86 which can consist of a thin metallized layer. Such a device has been described in U.S. Pat. No. 3,513,322. The analyzers 34 and 36 and the photoelectric cells 38 and 40 are arranged on opposite sides of the optical device and the active surface of the latter is much greater than that of the analyzers and cells so as to reduce the shadow effect to a maximum. This coaxial arrangement of the measuring and balancing beams makes it possible to obtain a higher luminous output since, contrary to the case of a semireflective plate arranged at 45°, practically all the light contributes to the production of useful electrical signals. On each occasion half of the incident beam is transmitted, the other half being reflected to arrive at the cells 38 and 40.

It is obvious that numerous changes may be made in the examples described above without thereby going beyond the scope of the invention. In particular, it is possible to provide a different arrangement of the measurement bridge, it comprising for instance purely electronic circuits (such as transistor circuits) of variable impedance, the value of which impedance may be controlled by the injected beam. On the other hand, the photoelectric means may comprise more or less sophisticated electronic circuits comprising, for instance, photosemiconductors. The mechanical shutter mechanism 66 can be substituted by electrical or magnetical pulse systems producing an amplitude-modulated (or intensity-modulated) light flux, such as a high frequency generator feeding a light source or feeding an electro-optical or magneto-optical cell disposed before a light source, or any "time sharing" system of the bridge by both beams. It is also possible to introduce beam 62 ahead of transducer 24 or even ahead of transducer 20 but the secondary beam 62 must be nonpolarized in such cases.

What is claimed is:

1. A measuring device for sensing an electrical quantity associated with a powerline, comprising a measuring station spaced apart from said powerline, means to direct a main beam of polarized light from the vicinity of said powerline to said station, a transducer sensitive to said electrical quantity and including a magneto-optically or electro-optically active body traversed by said main light beam in the vicinity of said powerline to modify the polarization of said main light beam as a function of the actual value of said quantity, detecting means to sense the modification of the polarization of said main light beam emerging from said transducer, means to develop a second light beam, optical means to divide said main and said second light beam each into a pair of elementary light beams, first photoelectric means disposed in the path of one of the elementary light beams of said main and second light beams, second photoelectric means disposed in the path of the other elementary light beam of said main and second light beams, electrical measurement bridge means in said measuring station having a first and a second branch wherein said first and second photoelectric means are respectively electrically inserted to develop an electrical bridge output signal representative of said electrical quantity, and means including said first and second photoelectric means to develop a bridge balancing electrical error signal from the elementary beams of said second light beam to balance said bridge means automatically.

2. A device according to claim 1, further comprising amplitude-modulating means for varying the intensity of the light flux of said second light beam at a relatively high frequency with respect to the frequency of said electrical quantity.

3. A device according to claim 1, wherein said means to develop a second light beam produce a nonpolarized light beam.

4. A device according to claim 2, wherein said electrical measurement bridge means comprise band filters to separate said error signal and said electrical bridge output signal representative of said electrical quantity.

5. A device according to claim 1, comprising means to introduce said second light beam in the path of said main light beam ahead of said optical means.

6. A device according to claim 1, wherein said means developing a bridge balancing electrical error signal comprise at least one variable voltage source.

7. A device according to claim 1, wherein said main light beam and said second light beam illuminate in 180° space opposition a central semireflecting surface inserted between optical focusing means and whereby said first and second photoelectric means and said detecting means are disposed on both sides of said focusing means.

* * * * *